United States Patent [19]
Ewert

[11] Patent Number: 6,138,820
[45] Date of Patent: Oct. 31, 2000

[54] CONVEYOR CHAIN LINK

[75] Inventor: Terry S. Ewert, Abbotsford, Wis.

[73] Assignee: Westar Mfg. Corp., Dorchester, Wis.

[21] Appl. No.: 09/079,351

[22] Filed: May 15, 1998

[51] Int. Cl.$^7$ .................................................. B65G 17/38
[52] U.S. Cl. .......................................... 198/850; 198/851
[58] Field of Search .................................... 198/850, 851, 198/853

[56] References Cited

U.S. PATENT DOCUMENTS

| | | | |
|---|---|---|---|
| 647,046 | 4/1900 | Tessier . | |
| 1,953,388 | 3/1934 | Bettin | 74/31 |
| 2,142,003 | 12/1938 | Mörgelin | 34/48 |
| 3,231,069 | 1/1966 | Lanham | 198/189 |
| 3,237,755 | 3/1966 | Weihe, Jr. | 198/183 |
| 3,489,278 | 1/1970 | Alexander | 209/74 |
| 3,626,690 | 12/1971 | Fischer | 59/84 |
| 3,680,927 | 8/1972 | Neureuther | 198/850 X |
| 3,921,792 | 11/1975 | Anderson | 198/189 |
| 4,202,441 | 5/1980 | Bourgeois | 198/779 |
| 4,718,543 | 1/1988 | Leisner et al. | 198/779 |
| 5,092,118 | 3/1992 | VanDeMark | 198/851 X |
| 5,105,938 | 4/1992 | Tan | 198/851 X |
| 5,108,350 | 4/1992 | Szpakowski | 474/207 |
| 5,133,447 | 7/1992 | Florindez | 198/463 |
| 5,445,569 | 8/1995 | Blase | 474/145 |
| 5,461,851 | 10/1995 | Lehrieder et al. | 59/4 |
| 5,467,860 | 11/1995 | Clopton | 198/779 |
| 5,489,020 | 2/1996 | Clopton | 198/853 X |
| 5,549,194 | 8/1996 | Dag | 198/845 |
| 5,562,200 | 10/1996 | Daringer | 198/850 X |

Primary Examiner—James R. Bidwell
Attorney, Agent, or Firm—Kinney & Lange, P.A.

[57] ABSTRACT

A chain link is attachable to forward and rearward links of identical construction to form a chain. The chain link includes a left and a right sidewall that each include a rearward and a forward plate with the forward plate inwardly offset from the rearward plate. Each rearward plate has a slotted aperture. A connecting pin having a rim at each end is inserted into a first portion of the slotted aperture which is sufficiently large for the rim to pass therethrough. The connecting pin has a connecting shoulder that extends inwardly from each rim and which engages a second portion of the slotted aperture in a snap fit engagement. The forward plates of each sidewall each have open ended slots for engaging a forward link. A rearward link engages a portion of the shoulder of the connecting pin. A roller is disposed between the two sidewalls freely rotating on the connecting pin.

18 Claims, 6 Drawing Sheets

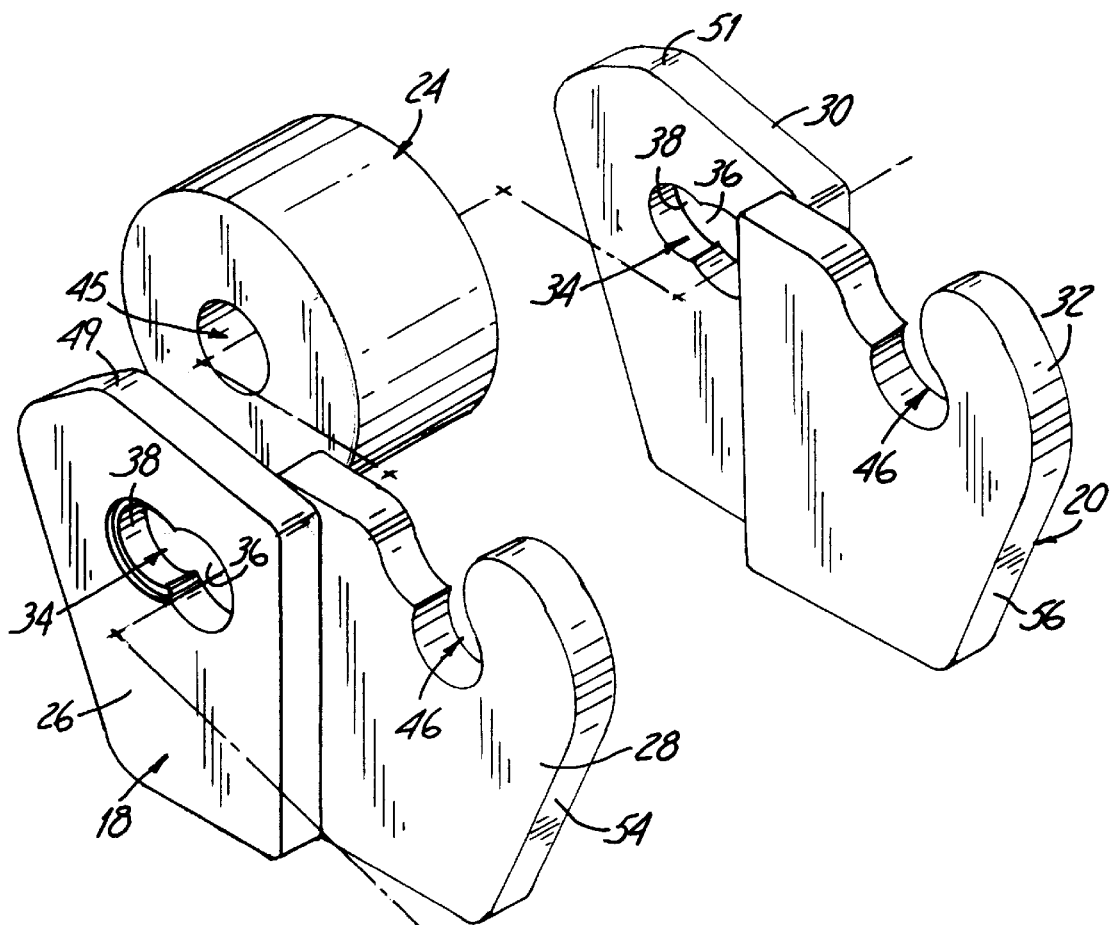
Fig. 9
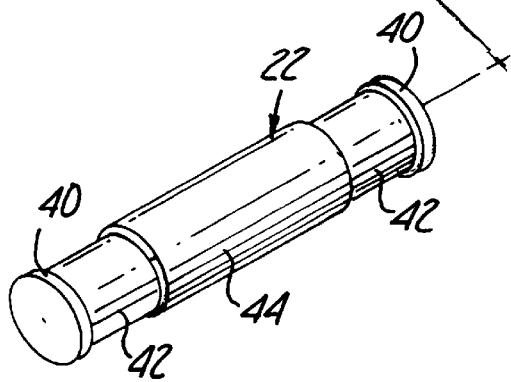

CONVEYOR CHAIN LINK

BACKGROUND OF THE INVENTION

The present invention relates to an accumulating conveyor chain link and a chain made of a plurality of such individual links.

Conveyor chains made of individual identical links are well known in the art. The following patents describe power transmission chains made up of individual identical links:

| Inventor | U.S. Pat. No. |
| --- | --- |
| Tessier | 647,046 |
| Bettin | 1,953,388 |
| Morglein | 2,142,003 |
| Lanham | 3,231,069 |
| Anderson | 3,921,792 |
| Blase | 5,445,569 |

There are also various chain constructions made up of individual identical links which convey articles thereon. Such chains typically include freewheeling rollers. The following patents describe some of these chain constructions:

| Inventor | U.S. Pat. No. |
| --- | --- |
| Weihe | 3,237,755 |
| Alexander | 3,489,278 |
| Leisener et al. | 4,718,543 |
| Clopton | 5,467,860 |
| Dag | 5,549,194 |

In addition, the Lehrieder et al. U.S. Pat. No. 5,461,851 describes a roller chain for use in drawing paper webs through a web-fed rotary printing press. The Szpakowski U.S. Pat. No. 5,108,350 describes a conduit carrier chain made of identical individual links. The Fischer U.S. Pat. No. 3,626,690 describes individual chain links for forming chains that are used in toys. Bourgeois U.S. Pat. No. 4,202,441 describes a compartmentalized conveyor belt system that includes a plurality of spaced roller bearing pins that extend transversely across the belt and are attached to individual link members that are attached to each other.

BRIEF SUMMARY OF THE INVENTION

The present invention includes a chain link which is connectable with other links to form a chain. The link is attachable to forward and rearward links of identical construction. The link includes a left and a right sidewall that each include a rearward and a forward plate with the forward plate inwardly offset from the rearward plate. Each rearward plate has a slotted aperture. A connecting pin having a rim at each end is inserted into a first portion of the slotted aperture which is sufficiently large for the rim to pass therethrough. The connecting pin also has a connecting shoulder that extends inwardly from each rim and which engages a second portion of the slotted aperture in a snap fit engagement. The forward plates of each sidewall each have open ended slots for engaging a forward link. A rearward link engages a portion of the shoulder of the connecting pin. A roller is disposed between the two sidewalls freely rotating on the connecting pin.

BRIEF DESCRIPTION OF THE DRAWINGS

FIG. 3 is a right side elevational view of the chain link.

FIG. 9 is an exploded perspective view of the chain link.

DETAILED DESCRIPTION

Figure 1:
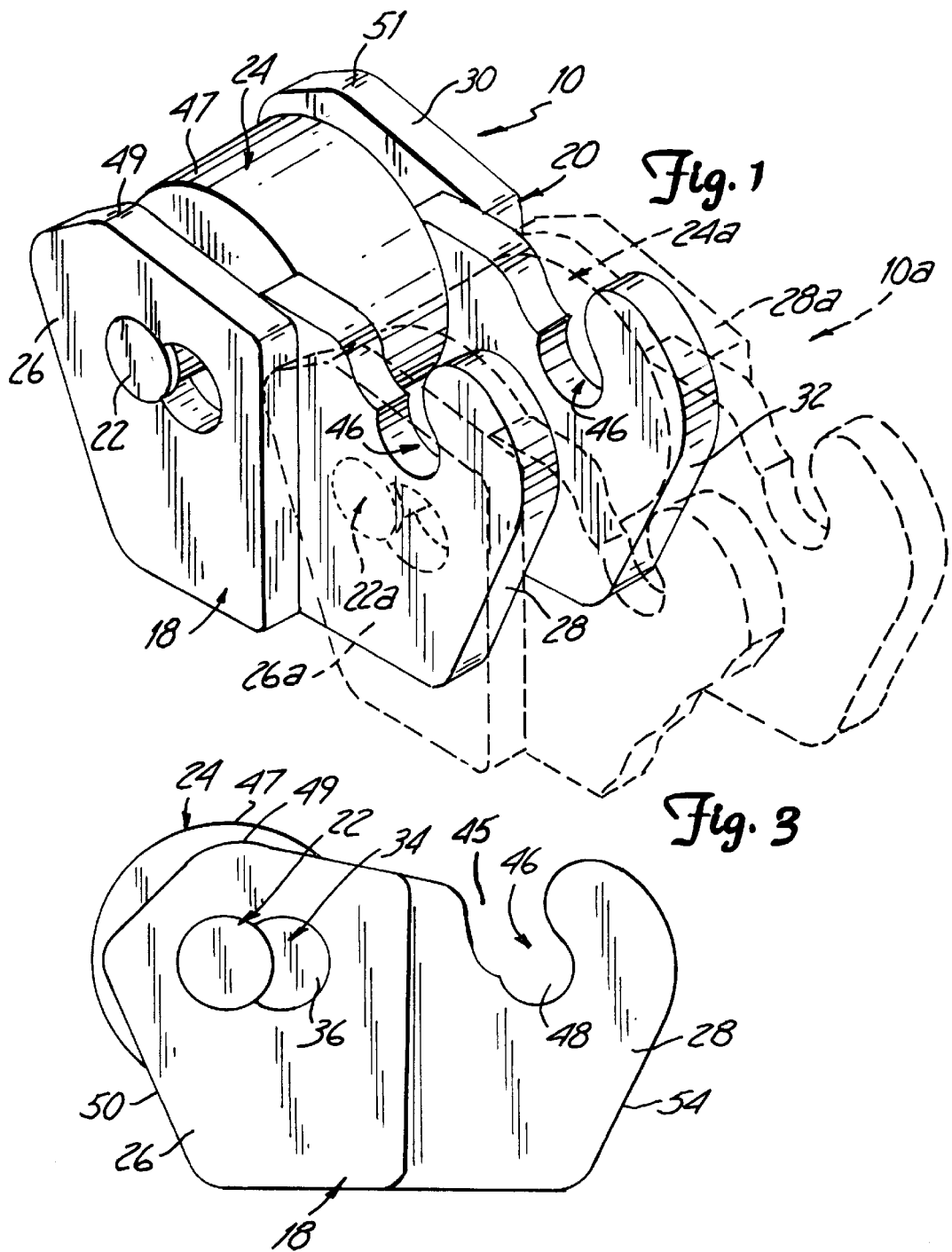
FIG. 1 is a perspective view of a chain link of the present invention.
Figure 2:
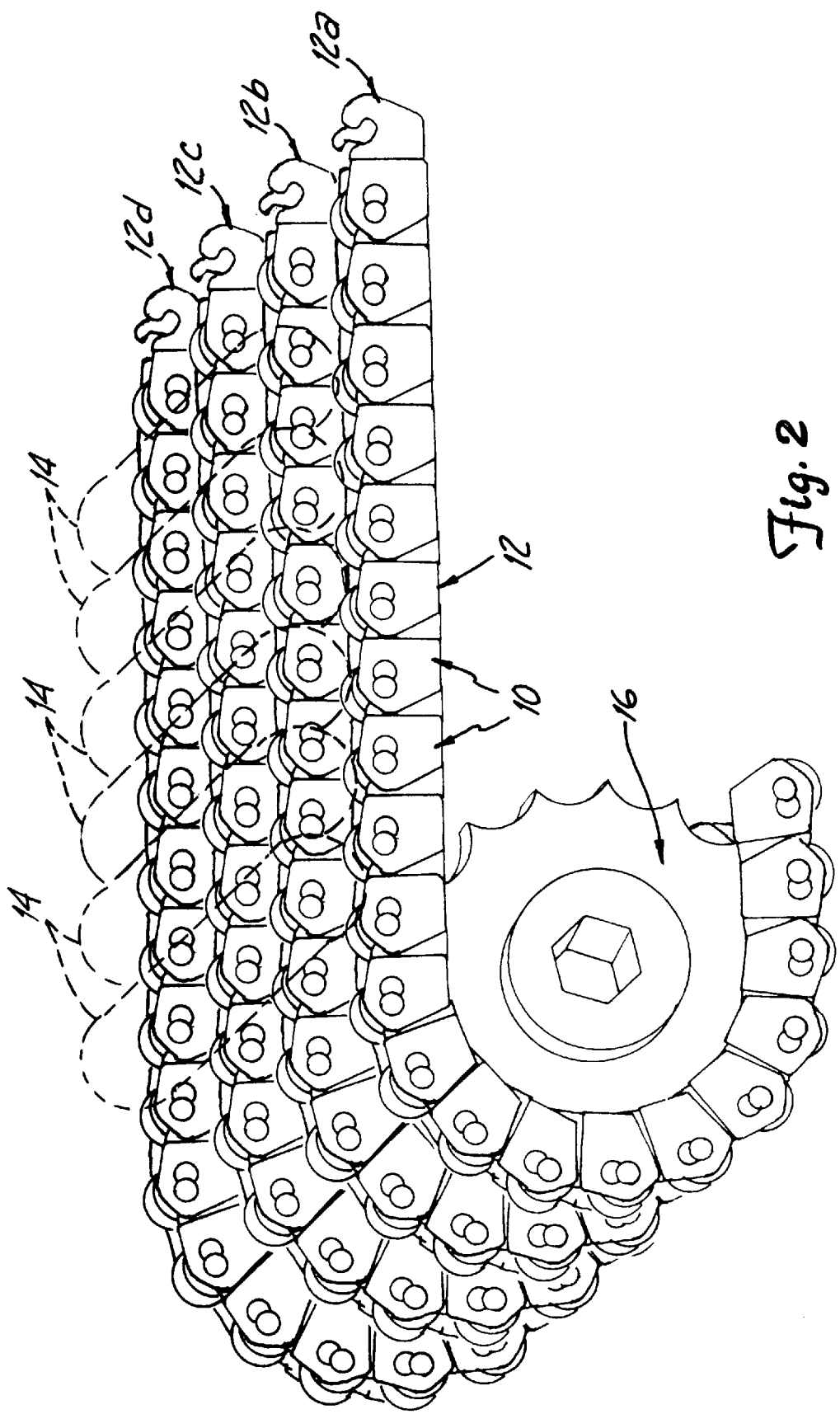
FIG. 2 is a perspective view of a plurality of chain links forming chains of the present invention.

The present invention includes a link generally indicated at 10 in FIG. 1. The link 10 is used to form a chain 12 as illustrated in FIG. 2 by connecting a plurality of such links. The chain 12 is used in association with similar chains as indicated by 12a, 12b, 12c and 12d that are part of a conveying system (not shown) or a piece of equipment (not shown) on which items 14 are being transported. The chains 12a, 12b, 12c and 12d are driven by conventional sprockets (only one of which is shown and designated by 16).

The chain 12 of the present invention is not only used for transporting items, but is also used as an accumulation conveyor chain in which items can accumulate as a group for transporting as a group to the next stage. For example, individual sausages accumulate up to a selected number for subsequent transport to a package (not shown). The links which comprise the chain of the present invention permit accumulation of items without the items stacking up on one another. Another advantage of the link 10 is that it is easily assembled or disassembled without having to use tools thereby making maintenance of the chain very convenient.

The individual chain link 10 includes a right side wall 18 transversely spaced from a left side wall 20. A connecting pin 22 connects the right and left sidewalls 18 and 20. A roller 24 is rotatably disposed on the pin 22 between the right and the left sidewalls 18 and 20.

The right sidewall 18 includes a rearward plate 26 and a forward plate 28. Similarly, the left sidewall 20 which is a mirror image of the right sidewall 28 also includes a rearward plate 30 and a forward plate 32.

The forward and rearward plates are integrally constructed and preferably molded of a synthetic polymer. Preferably, the synthetic polymer is easily cleanable and sterilizable. One preferred polymer is DELRIN made by E.I. Du Pont De NeMours and Company of Willmington, Del.

The forward plates 28 and 32 are inwardly offset from the rearward plates 26 and 30, respectively, for a purpose which will be explained subsequently. Each rearward plate includes a slotted aperture 34 of identical configuration. The slotted aperture 34 includes a first larger opening 36 and a second smaller opening 38 contiguous with the larger opening 36.

The connecting pin 22 includes a rim portion 40 at both ends and an annular connecting shoulder section 42 extending inwardly from each rim portion 40. The pin also includes a central roller engaging section 44. The roller 24 freely rotates on the roller engaging section 44 through a centrally disposed aperture 45. The connecting shoulder is preferably recessed (smaller in diameter) than the rim portion 40 and the central roller engaging section 44.

The first opening 36 of the slotted aperture 34 is sufficiently large so that the rim portion 40 can pass therethrough. The second opening 38 of the slotted aperture 34 is of a size and configuration such that the annular recessed connecting shoulder section 42 is engaged by moving the pin from opening 36 to opening 38. The opening 38 is of a size and configuration that the shoulder section 42 is engaged in a snap fit. Each rearward plate is rotatable within the opening 38 which enables the chain 12 to be flexible. A recess is provided in the outer surface of the plates 26 and 30 to accept the rim portions 40 so that the rim portions are flush with outer surfaces of the plates 26 and 30.

The slotted aperture 34 is disposed in the sidewalls 18 and 20 at a position such that the pin 22 positions an upper surface 47 of the roller 24 to extend above the sidewalls' 18 and 20 upper surfaces 49 and 51, as best illustrated in FIGS. 3–6. Positioning the roller so that a portion of the roller is disposed above the upper surfaces of the sidewalls 18 and 20, and along with the roller 24 freely rotating about the connecting pin permits items 14 to be transported and to accumulate as discussed previously in reference to FIG. 2.

Figure 5:
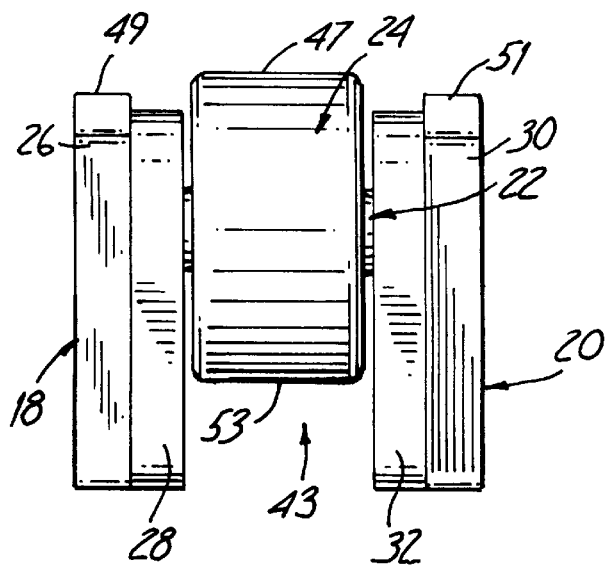
FIG. 5 is a front elevational view.
Figure 6:
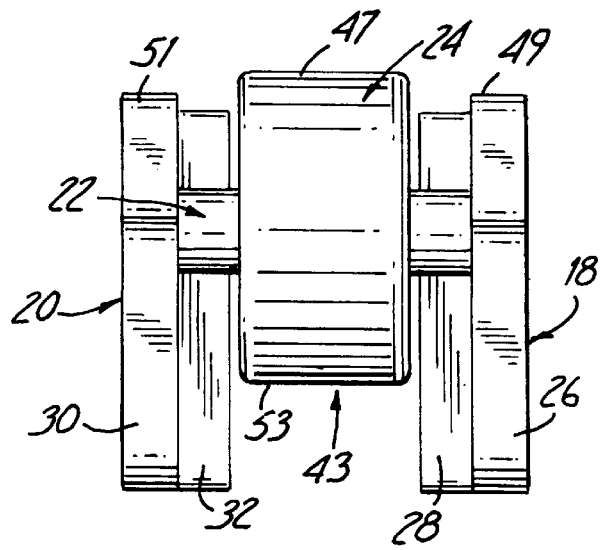
FIG. 6 is a back elevational view of the chain link.
Figure 8:
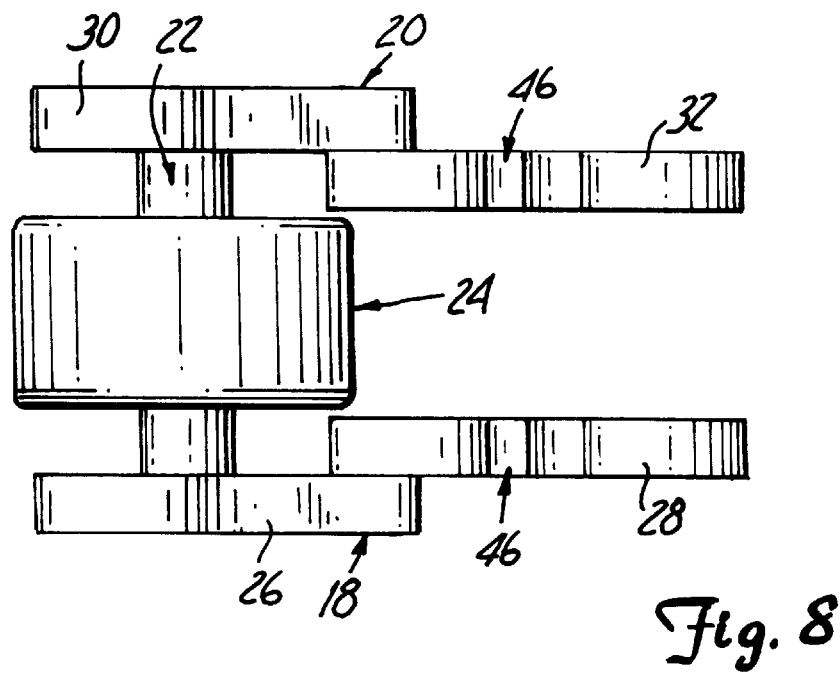
FIG. 8 is a top plan view of the chain link.
Figure 7:
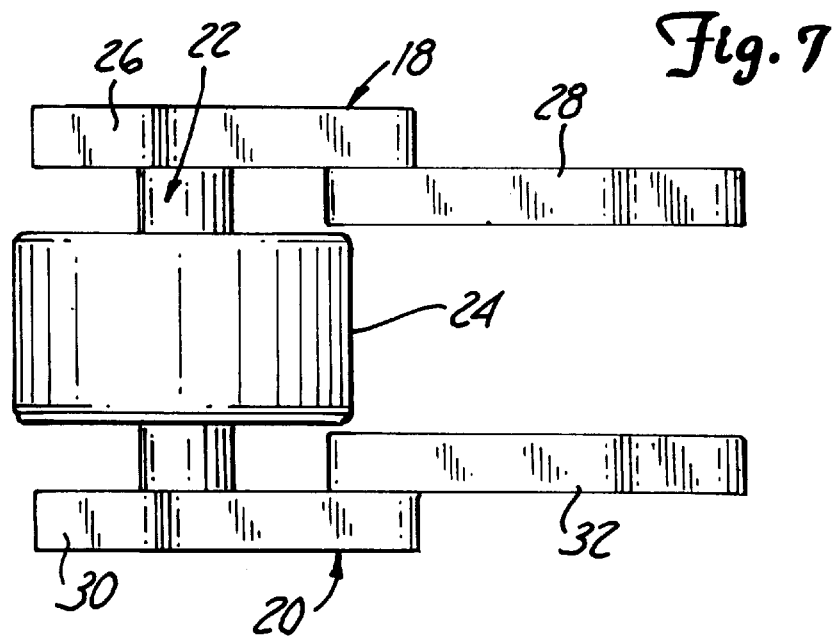
FIG. 7 is a bottom plan view of the chain link.

In addition, the roller 24 is positioned such that a lower surface 53 thereof in cooperation with the sidewalls 18 and 20 provides a recessed area 43 as best illustrated in FIGS. 5 and 6. It will be appreciated that when a chain is formed of the identical individuals link 10 of the present invention that the recessed area 43 will extend longitudinally along a bottom surface of the chain. The chain may then ride on and be guided on a track member (not shown) by engagement of the recessed area by the track member.

Figure 4:
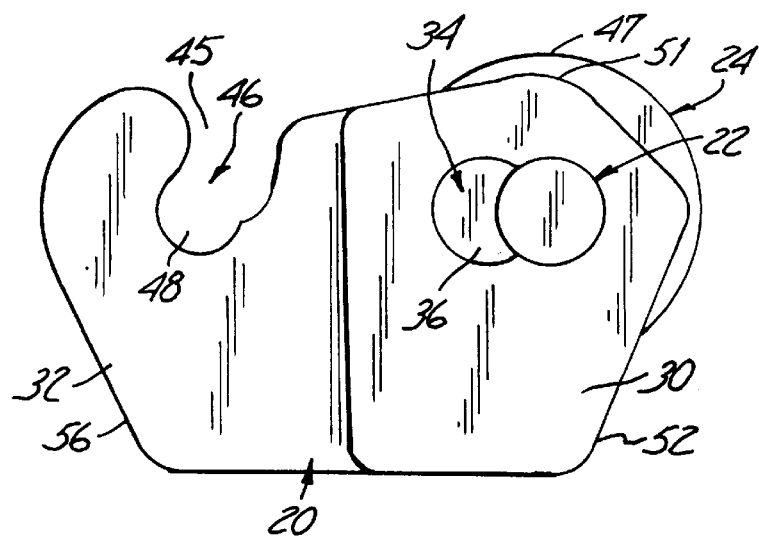
FIG. 4 is a left side elevational view of the chain link.

The forward plates 28 and 30 each have an open ended pin engaging slot 46, as best illustrated in FIGS. 3 and 4. The slot 46 has an open end 45 that faces generally upwardly. The slot 46 has an inward end portion 48 that is of a diameter and configuration that accepts the annular recessed connecting shoulder section 42 of the pin 22 in a snap fit connection. The slot is configured such that the upper portion of the forward plate is configured to resemble a horizontal J-hook. Once connected to the connecting shoulder section 42, the plates 28 and 30 can rotate about the pin.

Figure 10:
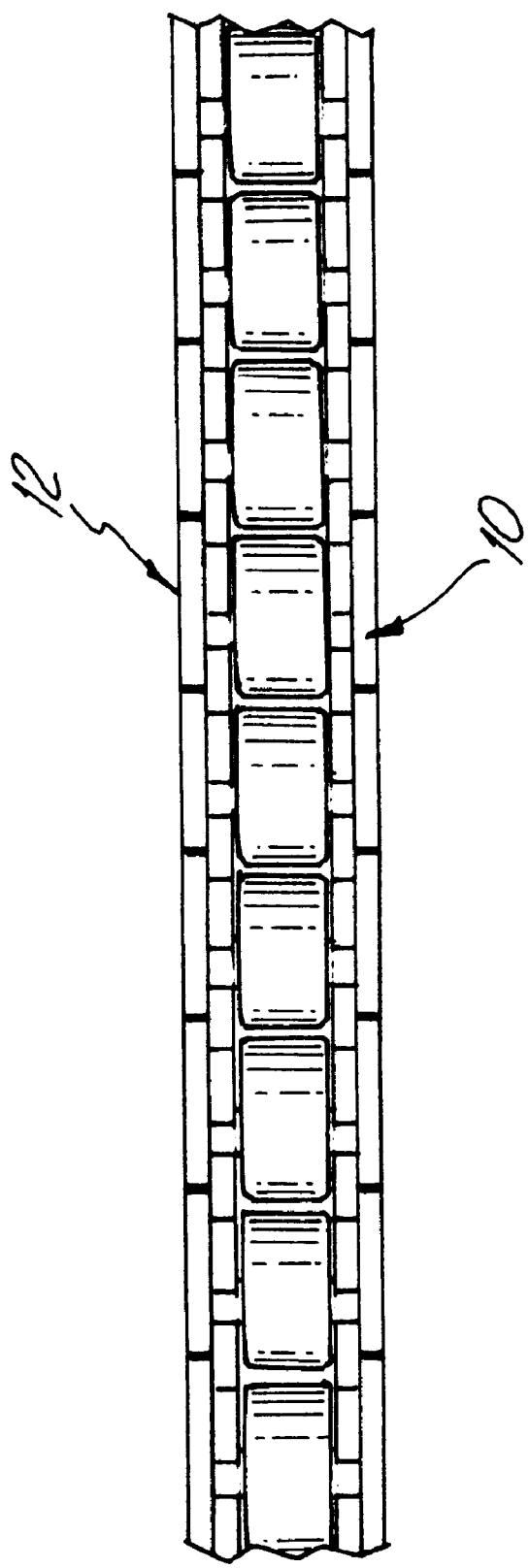
FIG. 10 is a top plan view of a chain made of the links of the present invention.

The forward plates 28 and 32 are offset inwardly from the rearward plates 26 and 30 a distance that is equal to the thickness of the respective rearward plate to accommodate a rearward plate 26a and 28a of a forward link 10a (identical in construction to link 10) as illustrated in FIG. 1. A connecting pin 22a of the forward link 10a engages the slot 46 of the forward plates 28 and 32 and engages the smaller portion of the slotted aperture of the plates 26a and 30a to form the link 10a and to connect the link 10 to the link 10a to thereby start forming the chain made of identical links of the present invention. All of the rearward plates, as best illustrated in FIG. 10, are aligned to produce a chain having left and right flush outer surfaces. Since the pins 24 are flush with outer surfaces of the rearward plates, the chain may be disposed inside a slot (not shown) that serves as a track or guide Similarly, although not as important, the forward plates are also aligned. The chain configuration also is such that the rollers 24 of the individual links are spaced close together. In one working example, the spacing between rollers of individual links is less than a 1/16 of an inch.

Referring back to FIGS. 3 and 4, the rearward plates 26 and 30 each have end walls 50 and 52, respectively, that slope inwardly toward the forward plate. Likewise, the forward plates 28 and 32 have end walls 54 and 56, respectively, which also slope inwardly, toward the rearward plates 26 and 30, respectively. The sloping of the end walls along with rotation about the connecting pins permits the chain to flex so that the chain may bend and wrap around the sprocket 16 as illustrated in FIG. 2.

Although the present invention has been described with reference to preferred embodiments, workers skilled in the art will recognize that changes may be made in form and detail without departing from the spirit and scope of the invention.

What is claimed is:

1. A link for a chain having a plurality of links, the link being attached to a forward and a rearward link of identical construction, the link comprising:

a connecting pin having a rim at each end and a connecting shoulder extending inwardly from each rim, a portion of each connecting shoulder for engaging with the rearward link;

a left sidewall and a right sidewall, each sidewall having a rearward plate and a forward plate that is inwardly offset from the rearward plate, each rearward plate having a slotted aperture with a first portion sufficiently large for the rim to pass through and a second portion having a diameter and construction to snap engage a portion of the connecting shoulder and the forward plates each having an open ended slot for engaging the forward link; and a roller rotatably disposed on the pin between the rearward plates.

2. The link of claim 1 wherein the forward link includes a forward connecting pin and forward left and right sidewalls, and wherein the open ended slots of the forward plates of the left and right sidewalls engage the forward connecting pin.

3. The link of claim 2 wherein the forward plates of the left and the right sidewalls engage the forward connecting pin on an inner side of the forward left and right sidewalls.

4. The link of claim 1 wherein the rearward link includes rearward left and right sidewalls, each sidewall having a rearward forward plate, and wherein the connecting pin engages the forward plates of the rearward link.

5. The link of claim 1 wherein each end of the connecting pin is flush with the outer surface of the left and right sidewalls.

6. The link of claim 1 wherein an upper surface of the roller extends above an upper surface of both the left and the right sidewalls.

7. The link of claim 1 wherein a lower surface of the roller is disposed at a height to form a recess between the left and the right sidewalls.

8. The link of claim 1 wherein each connecting shoulder has a diameter that is less than a diameter of the rim.

9. The link of claim 1 wherein each connecting shoulder is recessed in diameter from an edge of the rim and a central portion of the pin.

10. A chain made of a plurality of links, each link being attached to a forward and a rearward link of identical construction, each link comprising:

a connecting pin having a rim at each end and a connecting shoulder extending inwardly from each rim, a portion of each connecting shoulder in engagement with the rearward link;

a left sidewall and a right sidewall, each sidewall having a rearward plate and a forward plate that is inwardly offset from the rearward plate, each rearward plate having a slotted aperture with a first portion sufficiently large for the rim to pass through and a second portion having a diameter and construction to snap engage a portion of the connecting shoulder and the forward plates each having an open ended slot in engagement with the forward link; and a roller rotatably disposed on the pin between the rearward plates.

11. The chain of claim 10 wherein the forward link includes a forward connecting pin and forward left and right sidewalls, and wherein the open ended slots of the forward plates of the left and right sidewalls of the link of claim 1 are in engagement with the forward connecting pin.

12. The chain of claim 11 wherein the forward plates of the left and the right sidewalls engage the forward connecting pin on an inner side of the forward left and right sidewalls.

13. The chain of claim 10 wherein the rearward link includes rearward left and right sidewalls, each sidewall having a rearward forward plate, and wherein the connecting pin engages the forward plates of the rearward link.

14. The chain of claim 10 wherein each end of the connecting pin is flush with the outer surface of the left and right sidewalls.

15. The chain of claim 10 wherein an upper surface of the roller extends above an upper surface of both the left and the right sidewalls.

16. The chain of claim 10 wherein a lower surface of the roller is disposed at a height to form a longitudinal recess extending between the left and the right sidewalls of the plurality of links.

17. The chain of claim 10 wherein each connecting shoulder has a diameter that is less than a diameter of the rim.

18. The chain of claim 10 wherein each connecting shoulder is recessed in diameter from an edge of the rim and a central portion of the pin.

* * * * *